Nov. 10, 1925.
H. D. MILES
VACUUM DRYING APPARATUS
Filed Dec. 31, 1924 3 Sheets-Sheet 1
1,560,598
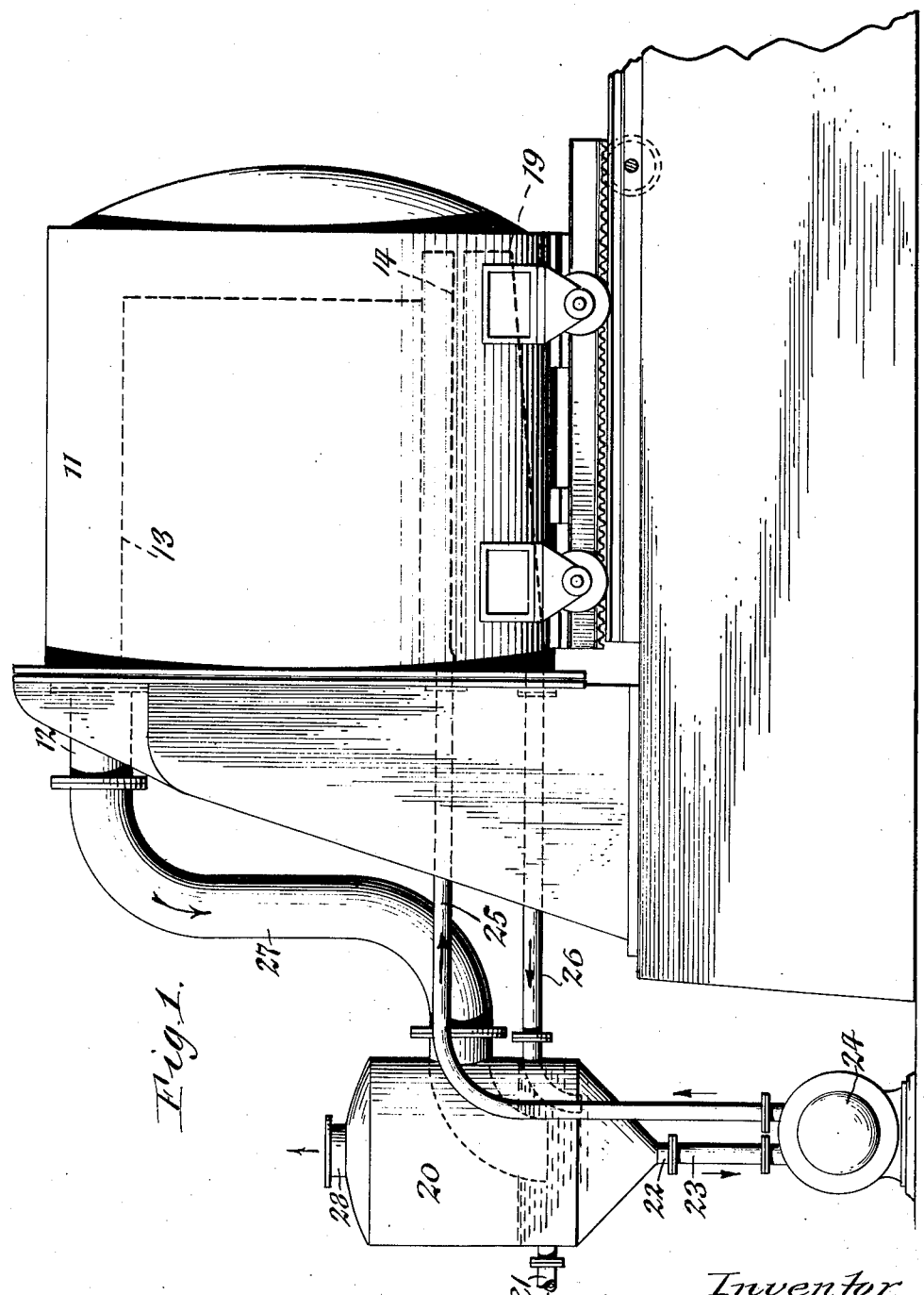
Fig.1.
Inventor
Henry D. Miles
by Robt Powers
Attorneys Nov. 10, 1925.

H. D. MILES

VACUUM DRYING APPARATUS

Filed Dec. 31, 1924

Inventor
Henry D. Miles
by Popp & Powers
Attorneys

Patented Nov. 10, 1925.

1,560,598

UNITED STATES PATENT OFFICE.

HENRY D. MILES, OF BUFFALO, NEW YORK, ASSIGNOR TO BUFFALO FOUNDRY & MACHINE COMPANY, OF BUFFALO, NEW YORK, A CORPORATION OF NEW YORK.

VACUUM DRYING APPARATUS.

Application filed December 31, 1924. Serial No. 759,203.

*To all whom it may concern:*

Be it known that I, HENRY D. MILES, a citizen of the United States, residing at Buffalo, in the county of Erie and State of New York, have invented new and useful Improvements in Vacuum Drying Apparatus, of which the following is a specification.

This invention relates to a vacuum drying apparatus, and more particularly to an apparatus of the character which permits of recovering the valuable dust constituents contained in vapor which is withdrawn from the liquid being desiccated and saving the same.

In vacuum drying apparatus, as heretofore constructed, the vapor withdrawn from the drying chamber was passed through water in a dust collector whereby the dust was absorbed by the water and eventually wasted when the water was discharged from the collector at the end of each day.

It is the object of this invention to provide a vacuum drying apparatus which is combined with a dust collector in such manner that the vapors and dust withdrawn from the drying chamber while desiccating under vacuo are passed through the liquid intended to be supplied to the means which feed the same to the drying drum, thereby extracting the dust from the vapors and effecting a substantial saving of desiccated material which otherwise would be lost.

In the accompanying drawings:—

Figure 1, is a side elevation of a vacuum apparatus embodying my invention.

Similar characters of reference indicate like parts throughout the several views.

Figure 2:
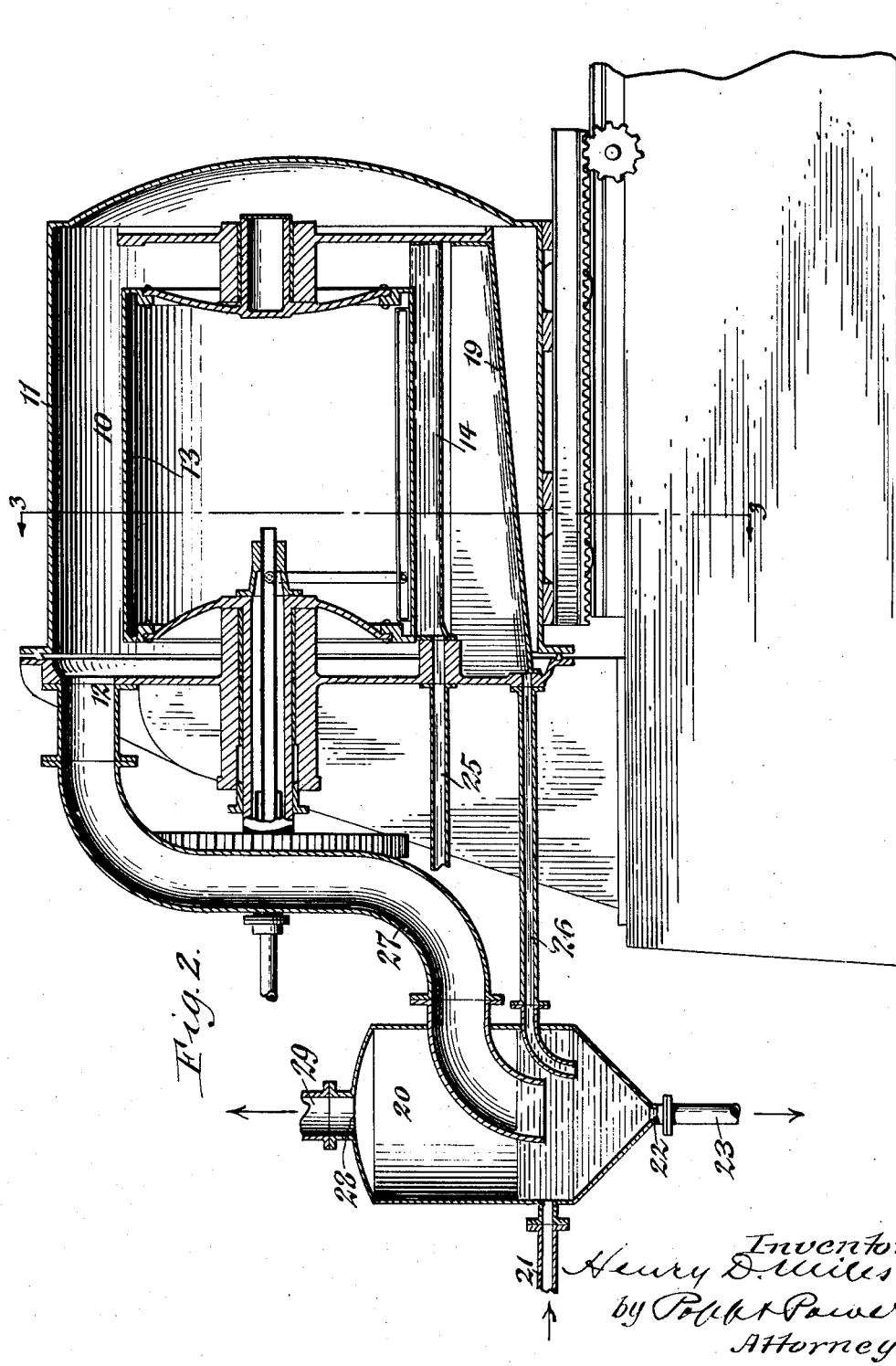
Figure 2, is a vertical longitudinal section of the same.
Figure 3:
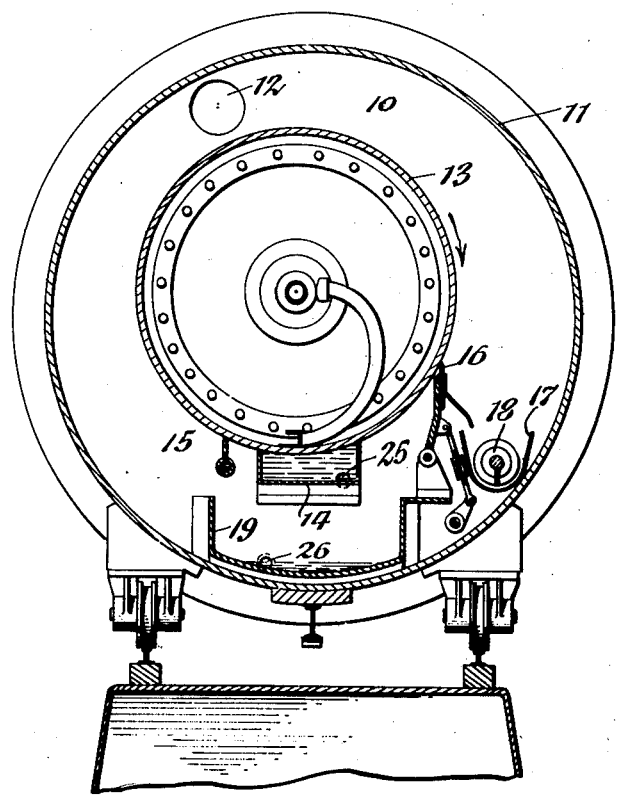
Figure 3, is a vertical transverse section of the apparatus taken on line 3—3, Figure 2.

The numeral 10 represents the drying chamber of the apparatus which is formed within an enclosing casing 11 and in which a vacuum is formed by withdrawing the free or floating contents of the drying chamber through a vapor and dust outlet 12 in the upper part thereof.

Mounted within the drying chamber so as to rotate about a horizontal axis is a horizontal drying drum 13 which is heated internally by supplying a heating medium thereto, such as steam. By this means a heated peripheral surface is produced on the drum whereby any solids containing liquid deposited on the drum will be desiccated, this process being accelerated and accomplished at a low temperature due to the vacuum in said chamber.

The liquid to be desiccated is presented to the underside of the drum by a feeding pan 14 so that the drum as it rotates dips with its underside into the liquid within the pan and picks up a thin film of the same. This film is spread uniformly over the surface of the drum by a spreader 15 and as the film of liquid is carried upwardly on one side of the drum and downwardly on the other side of the same it is deprived of its moisture and then removed from the drum preparatory to depositing a fresh film thereon. The removal of the dried film from the drum is effected by a knife or scraper 16 from which the dried material is directed into a conveyor trough 17 and carried away by a conveyor or screw 18.

The excess liquid which escapes from the feeding pan overflows the edge of the same and drops into an overflow trough 19 which is arranged in the drying chamber below the feeding pan so as to catch said excess liquid.

The apparatus for drying the liquid is combined with means for supplying the liquid to be dried, circulating the excess liquid, exhausting the vapor and dust from the drying chamber, and absorbing this dust in the liquid supply so as to recover this dust instead of permitting the same to go to waste.

For this purpose the following means are provided:—

The numeral 20 represents an upright dust collecting chamber which is adapted to contain a body of the liquid in its lower part while the upper part of the space therein is free. Below the normal liquid level of the chamber the same is provided with a liquid inlet 21 through which the liquid to be desiccated may be supplied from any suitable source and the supply regulated in any approved manner.

The liquid is withdrawn from this dust collecting chamber through a liquid outlet 22 in its bottom or lower part which is connected by a pipe 23 with the inlet of a pump 24. From the outlet of the latter the liquid is delivered by a pipe 25 to the feeding pan for replenishing the same with liquid and keeping the same supplied with a stream of liquid in excess of the picking up capacity of the drum so that some of the liquid will overflow from the pan and drop into the overflow trough. The excess liquid caught in this trough is returned from the same to the liquid in the dust collecting chamber by a return pipe 26 connected at one end with the overflow trough and opening at its opposite end into the dust collecting chamber below the normal liquid level therein, whereby this liquid is again put in circulation and fed with the other liquid in the dust collecting chamber to the drying drum.

The vapors and dust withdrawn from the drying chamber are carried through a pipe or conduit 27 which connects at one end with the vapor and dust outlet 12 of the drying chamber while its other end extends into the dust collecting chamber and terminates in the liquid below the normal level of the same.

In its upper part or top the dust collecting chamber has a vapor outlet 28 which is connected by a conduit or pipe 29 with an exhausting device of any suitable character, such as a pump or condenser, for withdrawing the dust and vapors from the drying chamber and creating a vacuum therein.

As the dust and vapors are withdrawn from the drying chamber the same are delivered by the pipe 27 into the liquid in the collecting chamber below the level of the same. These vapors pass in the form of bubbles upwardly through the liquid in the collecting chamber and any dust entrained therein is absorbed by the liquid and carried away with the latter by the pump and again presented by the feeding pan to the drying drum. The vapors which rise to the top of the liquid in the collecting chamber are now no longer dust laden inasmuch as the dust has been washed out of the same by the liquid and this liberated vapor is now carried off through the vapor outlet of the collecting chamber by the exhausting device connected therewith, thereby maintaining a vacuum in the drying chamber.

By thus utilizing the liquid supply of the apparatus as means for absorbing the dust which has been drawn with the vapors from the drying apparatus by vacuum this dust is recovered and added to this output of the machine and effecting a substantial saving, particularly in the case of valuable material such as powdered milk and the like.

I claim as my invention:—

1. A vacuum drying apparatus comprising means for desiccating the liquid, means for supplying the liquid to be desiccated, and means for producing a vacuum in the apparatus having a conduit leading from said desiccating means into said liquid supplying means.

2. A vacuum drying apparatus comprising a drying chamber having an outlet for vapor and dust, a drying drum movably arranged in the drying chamber, feeding means for supplying the liquid to be dried to said drum, a dust collecting chamber adapted to contain liquid to be desiccated and provided with a liquid supply, a vapor outlet in its upper part adapted to be connected with an exhausting device, and a liquid outlet in its lower part, a pump for withdrawing the liquid from said dust collecting chamber and delivering the same to said feeding means, and a vapor and dust conduit connected at one end with the vapor and dust outlet of said drying chamber and having its opposite end terminating in said dust collecting chamber below the liquid level therein.

3. A vacuum drying apparatus comprising a drying chamber having an outlet for vapor and dust, a rotary drying drum arranged within said chamber, feeding means for supplying the liquid to be desiccated to said drum, an overflow trough adapted to catch the excess liquid escaping from said feeding means, a dust collecting chamber adapted to contain liquid to be desiccated and provided in its side with a liquid supply, in its top with an outlet adapted to be connected with an exhausting device and in its bottom with a liquid outlet, a vapor pipe having its inlet connected with the outlet of said drying chamber and its outlet extending into said dust collecting chamber and terminating below the level of the liquid therein, a liquid return pipe extending from said overflow trough into said dust collecting chamber and terminating below the liquid level therein, and a liquid circulating pump having an inlet connected with the liquid outlet of said dust collecting chamber and also having an outlet which is connected with said liquid feeding means.

4. The hereindescribed method of desiccating liquid which consists in feeding the liquid to be desiccated to a moving heated surface which is in vacuo, maintaining a supply of liquid from which the same is drawn and delivered to the means which feed the same to said moving heated surface, and conducting the vapors and dust withdrawn by vacuo from liquid while being desiccated on said moving surface and delivering the same into said supply of liquid.

5. The hereindescribed method of desiccating liquid which consists in feeding the liquid to be desiccated to a moving heated surface which is in vacuo, maintaining a supply of liquid from which the same is drawn and delivered to the means which feed the same to said moving heated surface, conducting the vapors and dust withdrawn by vacuo from liquid while being desiccated on said moving surface and delivering the same into said supply of liquid and catching the excess liquid which escapes during said feeding operation and returning the same to said liquid supply.

HENRY D. MILES.